(12) United States Patent
Widder et al.

(10) Patent No.: US 7,332,468 B2
(45) Date of Patent: Feb. 19, 2008

(54) 8-TETRADECENAL AS FRAGRANCE AND FLAVORING SUBSTANCE

(75) Inventors: Sabine Widder, Holzminden (DE); Berthold Weber, Holzminden (DE); Marcus Eggers, Stadtoldendorf (DE); Jan Looft, Holzminden (DE); Tobias Voessing, Beverungen (DE); Wilhelm Pickenhagen, Chavannes des Bois (CH)

(73) Assignee: Symrise GmbH & Co. KG (DE)

( * ) Notice: Subject to any disclaimer, the term of this patent is extended or adjusted under 35 U.S.C. 154(b) by 0 days.

(21) Appl. No.: 10/483,345

(22) PCT Filed: Jul. 6, 2002

(86) PCT No.: PCT/EP02/07547

§ 371 (c)(1),
(2), (4) Date: May 17, 2004

(87) PCT Pub. No.: WO03/006591

PCT Pub. Date: Jan. 23, 2003

(65) Prior Publication Data

US 2004/0197358 A1    Oct. 7, 2004

(30) Foreign Application Priority Data

Jul. 11, 2001 (DE) ............................ 101 33 541

(51) Int. Cl.
A23L 1/22 (2006.01)
A23L 2/56 (2006.01)
A61K 8/00 (2006.01)
A61K 8/18 (2006.01)
A61Q 13/00 (2006.01)

(52) U.S. Cl. ............... 512/1; 512/27; 426/534

(58) Field of Classification Search ............ 512/27
See application file for complete search history.

(56) References Cited

U.S. PATENT DOCUMENTS 3,920,752 A * 11/1975 Lamparsky ............ 568/448
4,387,248 A * 6/1983 Pickenhagen et al. ..... 568/448

* cited by examiner

Primary Examiner—Jill Warden
Assistant Examiner—Keri A Moss
(74) Attorney, Agent, or Firm—Akerman Senterfitt; Stephan A. Pendorf

(57) ABSTRACT

The invention relates to the use of (Z)-8-tetradecenal and of a mixture consisting of (Z)-8-tetradecanal and (E)-8-tetradecanal as an odorous or aromatic substance.

11 Claims, 2 Drawing Sheets

8-TETRADECENAL AS FRAGRANCE AND FLAVORING SUBSTANCE

CROSS REFERENCE TO RELATED APPLICATION

This application is a national stage of PCT/EP02/07547 filed Jul. 6, 2002 and based upon DE 101 33 541.5 filed Jul. 11, 2001 under the International Convention.

FIELD OF THE INVENTION

The invention relates to the use of (Z)-8-tetradecenal, (E)-8-tetradecenal or a mixture of (Z)-8- and (E)-8-tetradecenal as perfume (fragrance) or flavoring agent (flavoring).

The invention furthermore relates to a corresponding method for imparting or intensifying a citrus perfume or citrus flavor to a base composition, a method for modifying a perfume and flavoring composition and also corresponding perfume or flavoring compositions themselves.

BACKGROUND TO THE INVENTION

In perfuming and flavoring practice there is generally an ongoing requirement for synthetic perfumes and flavoring agents that can be prepared inexpensively and with constant quality, remain stable on prolonged storage, if possible also in contact with other substances, and have desired olfactory or taste characteristics. Perfumes should have pleasant perfume notes of adequate intensity that are as natural as possible and be able to have an advantageous effect on the perfume of cosmetics or industrial consumer goods. Flavoring agents should be easily digestible, be reminiscent of typical flavor components of popular foods or even identical to the latter and be able to make a positive contribution to the flavor of foods, medicaments to be administered orally, and the like. Discovering perfume and flavoring agents that comply with these requirements has proved to be relatively laborious and demands regular extensive research, in particular if the aim is to find interesting novel perfume notes or flavor trends.

The search for suitable perfume or flavoring agents is made more difficult for the person skilled in the art, in particular because of the following factual issues:

The mechanisms of perfume and flavor perception are not known.

Objective, quantitative characterization of a perfume or flavor is not possible.

The relationships between perfume and/or flavor perception, on the one hand, and the chemical structure of the perfume and/or flavoring agent, on the other hand, have not been adequately researched.

Frequently even minor changes in the structural composition of known perfume or flavoring agents give rise to substantial changes in the olfactory or flavor characteristics and impair the compatibility for the human organism.

The success of the search for suitable perfume or flavoring agents therefore frequently depends on the intuition of the searcher.

DETAILED DESCRIPTION

Figure 1:
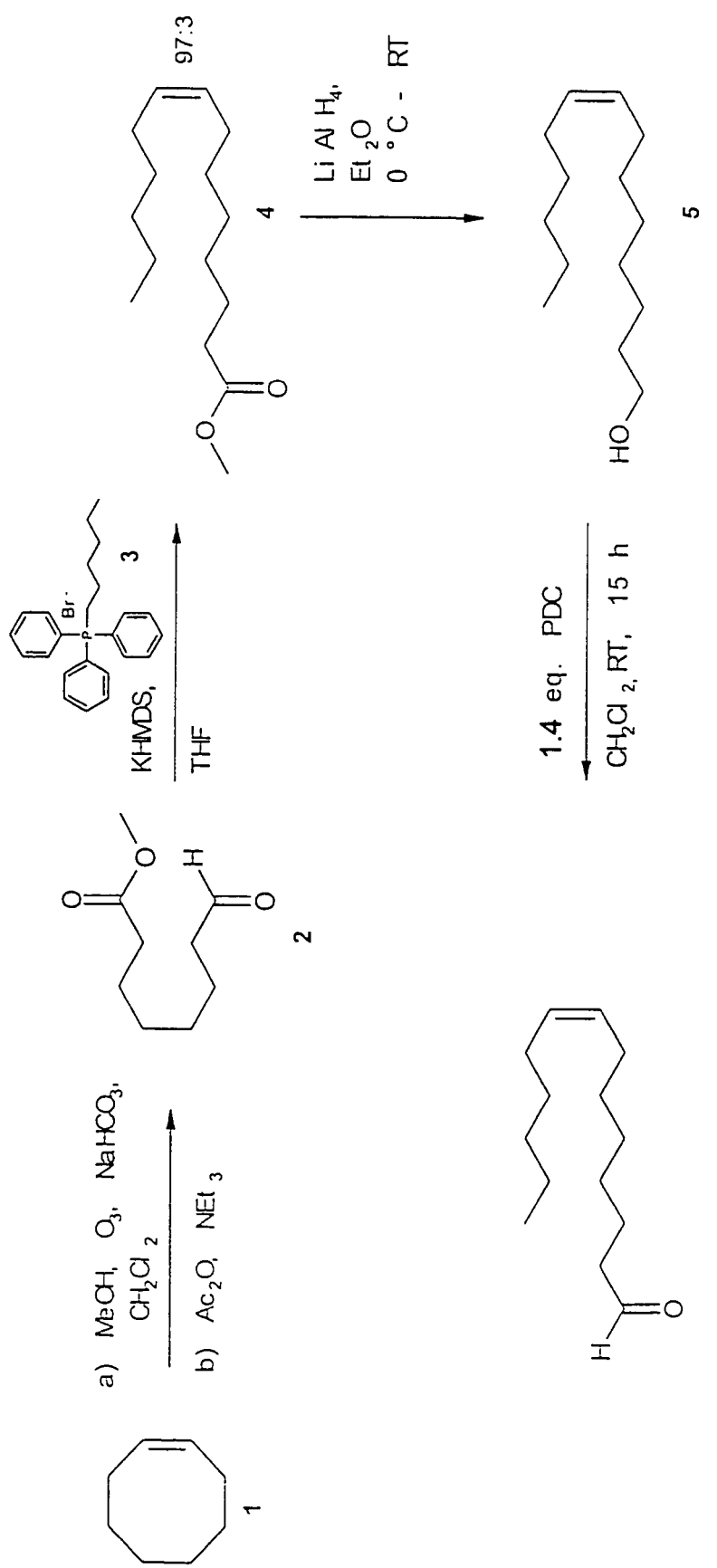
FIG. 1 shows a diagrammatic scheme for the synthesis of (Z)-8-tetradecenal.

The objective on which the present invention is based is, taking into account the general framework conditions described above, to indicate a perfume and flavoring agent which, in particular, is able to impart a fresh citrus perfume to conventional perfume or flavor base compositions or to modify the existing citrus perfume of such compositions in an advantageous manner, i.e. in particular to freshen it, to make it appear juicier and more authentic and to impart body and fullness to the entire composition.

The substances to be indicated should, in particular, be able to have an advantageous influence on the sensory properties of citrus fruit compositions, i.e. of compositions that remind the consumer of, for example, bitter orange, lime, grapefruit, mandarin, clementine, lemon, cedral lemon, orange, kumquat or the like and/or contain citrus oils.

The substances to be indicated should offer the perfumerer or flavoring specialist an alternative to the citrus perfumes or flavoring agents used or described hitherto which can be widely used when composing perfumes or flavors. Specifically, in the creative process of composition, a laborious process, which as a rule is carried out only by specialists, it is not sufficient to use, in the manner of a template, an arbitrary perfume or flavoring agent to which a specific fragrance or flavor aspect has been assigned in the literature in order to obtain a perfume or flavor image that already exists in the imagination. Specifically, the fragrance or flavor characteristic of a composition cannot be precisely predicted in the sense of an addition if only the constituents of the composition are known, since these constituents are subject to unforeseeable interactions in the mixture. The compatibility of a perfume or flavoring agent with the other constituents of a composition and the presence or lack of accompanying aspects that can be detected by the senses and also have an effect on the overall character of the finished composition, without them perhaps being particularly acknowledged in the description of the fragrance of the pure substance, is therefore also important.

The invention is based on the surprising finding that, in particular (Z)-8-tetradecenal, but also to a somewhat weakened extent (E)-8-tetradecenal, as well as mixtures of (Z)-8- and (E)-8-tetradecenal are outstandingly suitable for use as perfume and flavoring agent and also to achieve the objectives indicated above.

(Z)-8-tetradecenal has a particularly low odor threshold value of only 0.009 ppb (odor threshold value in water), so that even small amounts of this substance give rise to a modification of a perfume or flavoring (base) composition that can be detected by the senses. It is true that, according to our own research, the odor threshold of (E)-8-tetradecenal is only at 1.24 ppb, but it is still outstandingly suitable for use in perfume and flavoring agent compositions, and specifically especially as a mixture with (more active) (Z)-8-tetradecenal.

The substances (Z)-7-tetradecenal and (Z)-9-tetradecenal, which are closely related to (Z)-8-tetradecenal according to the invention in respect of chemical structure and, in contrast to the latter, are commercially available, do not have any usable sensory properties compared with (Z)-8-tetradecenal. In particular, their odor threshold is surprisingly approximately two orders of magnitude higher than that of (Z)-8-tetradecenal; in this context see the example further below.

The substances (Z)-8- and (E)-8-tetradecenal are already known and, in this regard, reference is made in particular to the following literature:

1. Kováts Retention Indexes of Monounsaturated C12, C14 and C16 Alcohols, Acetates and Aldehydes Commonly Found in Lepidopteran Pheromone Blends (Francisco de A. Marques, J. S. McElfresh, Jocelyn G. Millar; J. Braz. Chem. Soc. (2000), 11 (6), 592-599).
2. Gas chromatographic determination of vapour pressures of pheromone-like compounds III. Aldehydes (Bohumir Koutek, Michal Hoskovec, Pavlina Vrkocová, Karel Knecný, Ladislav Feltl, Jan Vrkoc; J. Chromatogr., A (1996), 719 (2), 391-400).
3. Mammalian Exocrine Secretions: IX. Constituents of Preorbital Secretion of Oribi, Ourebia, ourebi (W.-P. Mo, B. V. Burger, M. LeRoux, H. S. C. Spies; Chem. Ecol. (1995), 21(8), 1191-215).

However, the sensory properties of (Z)-8- and (E)-8-tetradecenal have not been studied to date; the abovementioned documents relate to problems in clarification of the structure in relation to the study of pheromones.

Publications on the organoleptic or sensory properties of aliphatic aldehydes, to which the substances according to the invention belong after all, also gave no indication of the special properties of (Z)-8-tetradecenal and (E)-8-tetradecenal.

Volatile components of coriander plants, which also include a number of aliphatic aldehydes, are described in the article on "Character-impact aroma components of coriander (*Coriandrum sativum* I.) herb", Cadwallader, K. R.; Surakarnkul, R.; Yang, S.-P.; Webb, T. E. Flavor Chem. Ethn. Foods, [Proc. Meet. 5$^{th}$ Chem. Cong. North Am.] (1999), Meeting Date 1997, 77-84. Editor(s): Shahidi, Fereidoon; Ho, Chi-Tang. Publisher: Kluwer Academic/Plenum Publishers, New York, N.Y. Compounds tested are indicated giving a description of the odor in a Table 1. However, a citrus-like odor is assigned to only one compound of the alkanals tested, specifically a "citrus peel" odor to the relatively short-chain compound (E)-4-decenal, which odor is, however, in the background behind a green odor in terms of intensity. The odor of (E)-2-tetradecenal, which has the same chain length as the compounds according to the invention but, however, contains a double bond conjugated to the carbonyl group and, to this extent, is chemically not comparable to the compounds according to the invention, is, on the other hand, indicated only as "fatty, waxy, cheesy"; and the other alkanals tested also do not include a citrus odor aspect.

Subjectively quantified organoleptic properties of aldehydes are summarised in an article on "Organoleptic properties of aliphatic aldehydes", Boelens, Mans H.; Van Gemert, Leo J.; Perfum. Flavor. (1987), 12(5), 31-7, 40, 43. In this study, the aldehydes studied were also assessed subjectively with regard to their citrus character and it can be established that, in the view of the perfumerers and flavoring specialists carrying out the study, the compound (E)-2-tetradecenal, which is already known from the literature discussed above, includes a weak citrus aspect which, however, is clearly in the background behind a strong fatty aspect. The situation is quite similar in the case of the further mono-unsaturated aldehydes studied and specifically especially in the case of the aldehydes with a non-conjugated double bond. If these include a citrus aspect at all (which is not the case in the majority of cases), this aspect is overlaid by the green, fatty and/or flowery odor aspects. A noteworthy citrus aspect was assigned only to the substances trans-2-octenal, trans-2-decenal and trans-2-undecenal (especially in dilute form), each of which contains a conjugated double bond. However, because of their deviating chain length and the conjugation of the double bonds, these substances are chemically no longer particularly similar to the compounds according to the invention, so that it was not possible for a person skilled in the art to derive anything from their sensory properties for the substances according to the invention. In our own performance comparison tests, the substances according to the invention (with non-conjugated double bond) were, moreover, clearly superior to the trans-2-alkenals mentioned. Furthermore, in contrast to the said trans-2-alkenals, the substances according to the invention impart body and fullness to the perfume and flavor compositions. The modifications achieved by the substances according to the invention could thus not be achieved by the said trans-2-alkenals.

Viewed from a slightly different angle, the present invention makes available a method for imparting a citrus perfume or citrus flavor to or intensifying a citrus perfume or citrus flavor of a base composition, which is characterised in that (a) an amount of (Z)-8-tetradecenal, (E)-8-tetradecenal or of a mixture of (Z)-8- and (E)-8-tetradecenal that is effective from the sensory standpoint and (b) constituents of the base composition are mixed.

With this method the base composition can be initially introduced complete or the substance according to the invention listed under (a) can be mixed with the constituents of the base composition that have been initially introduced in any desired sequence.

The invention also relates to a method for modifying a perfume or flavor composition (that is prespecified physically or in terms of its composition), wherein an amount of (Z)-8-tetradecenal, (E)-8-tetradecenal or of a mixture of (Z)-8- and (E)-8-tetradecenal that modifies the perfume or the flavor is added to the perfume or flavor composition.

With this method the perfume or flavor composition to be modified can be initially introduced complete or the substance according to the invention can be mixed with the specified constituents of the perfume or flavor composition in any desired sequence. After what has been stated above, it is clear that the modification is, as a rule, carried out with regard to the citrus aspect; however, it is also possible to allow certain citrus perfume or flavor compositions to appear fresher, juicier, fuller and/or more typical by the addition of the substances according to the invention, without influencing the primary citrus aspect to a noteworthy extent.

The present invention also relates to a perfume or flavor composition that contains an amount of (Z)-8-tetradecenal, (E)-8-tetradecenal or a mixture of (Z)-8- and (E)-8-tetradecenal that is active from the sensory standpoint. The perfume or flavor composition is preferably a citrus composition, the term citrus encompassing, in particular, bitter orange, lime, grapefruit, mandarin, clementine, lemon, cedral lemon, orange and kumquat.

Compositions according to the invention that contain a proportion of 0.001 to 1% (m/m), preferably 0.001 to 0.1% (m/m) (Z)-8-tetradecenal, based on the total mass of the composition, are particularly preferred. Surprisingly, a proportion of only 0.001% (m/m) (Z)-8-tetradecenal is, specifically, already sufficient to make a conventional orange flavor fresher, juicier, more typical and more harmonious. Accordingly, in the use according to the invention and the methods according to the invention, the said proportions of (Z)-8-tetradecenal are advantageously set.

Finally, the present invention also relates to an article, for example (a) a personal hygiene product, a cleaning agent or another product not intended for consumption or (b) a food (including drinks suitable for consumption), which contains a proportion of 0.0001 to 1% (m/m), preferably 0.01 to 0.1% (m/m) of a perfume or flavor composition according to the invention, based on the total mass of the article.

Such an article preferably contains a proportion of 1 ppb to 100 ppm (Z)-8-tetradecenal, based on the total mass of the article.

The invention will be explained in more detail below on the basis of examples.

EXAMPLE 1

Determination of the Odor Threshold Values of (Z)-8- and (E)-8-tetradecenal and of Comparison Substances The odor threshold values in water were determined in the conventional manner for (Z)-8- and (E)-8-tetradecenal and for two comparison substances. The results are summarised in Table 1:

TABLE 1

| Substance | Odor threshold value [ppb] |
| --- | --- |
| 7-(Z)-tetradecenal | 2.60 ppb |
| 8-(Z)-tetradecenal | 0.009 ppb |
| 8-(E)-tetradecenal | 1.24 ppb |
| 9-(Z)-tetradecenal | 1.44 ppb |

It can be seen that (Z)-8-tetradecenal has an odor threshold value that is approximately 2 orders of magnitude lower than that of the structurally related substances (Z)-7-tetradecenal and (Z)-9-tetradecenal.

EXAMPLE 2

Descriptions of the Odors of (Z)-8- and (E)-8-tetradecenal

The substances (Z)-8- and (E)-8-tetradecenal according to the invention were tested by a panel of expert flavoring specialists in the conventional manner. The experts assessed the relevant odors on the basis of the procedure in the article entitled "Organoleptic properties of aliphatic aldehydes", Boelens, Mans H.; Van Gemert, Leo J.; Perfum. Flavor. (1987), 12(5), 31-7, 40, 43, which has already been cited, i.e. they quantified the odors of the particular substance on the basis of an assessment scale with rankings of 0-4. The rankings have the following meanings:
0: absent
1: weak
2: moderate
3: strong
4: very strong The results of the investigation are summarised in Table 2.

| | 8-(Z)-tetradecenal | 8-(E)-tetradecenal |
| --- | --- | --- |
| Citrus-like | 4 | 1-2 |
| Fruity | 1 | 0 |
| Flowery | 2 | 0-1 |
| Of orange peel | 4 | 0 |
| Of pith | 4 | 1 |
| Sweet | 3 | 1-2 |
| Fatty | 1 | 4 |
| Waxy | 1-2 | 4 |

-continued

| | 8-(Z)-tetradecenal | 8-(E)-tetradecenal |
| --- | --- | --- |
| Green-herby | 0 | 1 |
| Honey-like (beeswax) | 2 | 0 |
| Fresh, fizzy | 4 | 0 |
| Chemical | 0-1 | 2-3 |

EXAMPLE 3

Modification of a Conventional Flavor Composition (Orange Flavor)

A conventional flavor composition (composition A) was compared with a flavor composition according to the invention (composition B). As can be seen from Table 4 below, composition B substantially corresponded to composition A, but, in contrast to composition A, composition B contained a proportion of 0.005% (m/m) (Z)-8-tetradecenal (based on the total mass of the composition), which was compensated for by a reduction in the proportion of orange oil.

TABLE 4

Compositions of compositions A and B

| | Orange flavor composition | |
| --- | --- | --- |
| | A | B |
| Octanal | 0.3% | 0.3% |
| Linalool | 0.7% | 0.7% |
| Decanal | 0.4% | 0.4% |
| Citral | 0.1% | 0.1% |
| Dodecanal | 0.07% | 0.07% |
| Citronellal | 0.06% | 0.06% |
| Terpineol | 0.07% | 0.07% |
| Ethyl butyrate | 0.15% | 0.15% |
| Octanol | 0.05% | 0.05% |
| Acetaldehyde | 0.08% | 0.08% |
| Mandarin oil | 0.15% | 0.15% |
| Lemon oil | 0.8% | 0.8% |
| Orange oil | 97.07 | 97.065 |
| 8-(Z)-tetradecenal | | 0.005% |

The flavor of the composition B according to the invention was distinctly fresher, juicier, fuller and more typical compared with the flavor of the conventional composition A.

EXAMPLE 4

Synthesis of (Z)-8-tetradecenal

The synthesis is shown diagrammatically in FIG. 1.

(Z)-8-tetradecenal (6) was prepared in four steps from cyclooctene (1): ozonolysis of cyclooctene (1) and working up in accordance with the method of S. L. Schreiber et al, (see below) gave methyl 8-oxooctanoate (2), which was converted to (Z)-tetradecene methyl ester (4) by (Z)-selective Wittig reaction with n-Hexyltriphenylphosphonium bromide (3). After reduction of (4) with lithium alanate to give the alcohol (5) and oxidation with PDC, (Z)-8-tetradecenal (6) was obtained:

Methyl 8-oxooctanoate (2)

Methyl 8-oxooctanoate (2) was prepared analogously to the method of S. L. Schreiber, R. E. Claus, J. Regan, *Tetrahedron Letters* 1982, 38, 3867-3870:

48 g cyclooctene (1) and 8.4 g sodium bicarbonate were ozonolysed in 48 g methanol and 1 l dichloromethane at −78° C. for 5.5 h. 304 g triethylamine was added slowly dropwise at −60 [lacuna] C and the reaction mixture was allowed to warm to room temperature in the course of 1 h. The reaction mixture was washed with sodium thiosulphate solution (10%, 200 ml), 2 N HCl (150 ml), NaOH (5%, 150 ml) and NaCl solution (saturated, 200 ml) and dried over sodium sulphate and the solvent was distilled off. After distillation, methyl 8-oxooctanoate (2) was obtained.

Methyl (Z)-8-tetradecenoate (4)

Methyl (Z)-8-tetradecenoate (4) was synthesised analogously to the method of J. Bestmann, W. Stransky, O. Vostrowsky, *Chem. Ber.* 1976, 109, 1694-1700 and L. F. Tietze, Th. Eicher, *Reaktionen und Synthesen*, (*Reactions and Syntheses*) Georg Thieme Verlag Stuttgart, New York 1991, 192:

82.5 g n-hexyl bromide and 131.2 g triphenylphosphine were boiled under reflux for 35 h in 500 ml toluene. The solvent was distilled off, the residue was taken up in dichloromethane and 1 l diethyl ether was added. Crystallisation at −15° C. gave n-hexyltriphenylphosphonium bromide (3).

29.35 g 3 and 150 ml potassium bis-(trimethylsilyl)-amide were boiled in 120 ml THF (abs.) for 1.5 h under blanketing gas. 12.91 g methyl 8-oxooctanoate (2) in 20 ml THF was added dropwise at −78° C. and the reaction mixture was stirred for 2.5 h at −78° C. The reaction mixture was allowed to warm to room temperature, poured onto 150 ml sulphuric acid (10%)/75 g ice and extracted twice with 150 ml pentane. The organic phase was washed with sodium bicarbonate solution and NaCl solution (saturated) and dried over sodium sulphate and the triphenylphosphine oxide was separated off by crystallisation at −20° C. Distillation under a high vacuum gave methyl (Z)-8-tetradecenoate (4) (Z/E ratio according to GC>97/3).

(Z)-8-Tetradecen-1-ol (5)

(Z)-8-tetradecen-1-ol (5) was prepared analogously to the method of K. Schwetlick et al., *Organikum*, (*Organic Chemistry*), 17. Ed. VEB Verlag, Berlin 1988, pp. 494-495:

0.95 g lithium aluminium hydride was suspended in 150 ml diethyl ether under blanketing gas and 10 g methyl (Z)-8-tetradecenoate (4) was added dropwise at 0° C. The reaction mixture was stirred for 0.5 h at 0° C. and for 5 h at room temperature. 1 ml water and 1 ml NaOH solution (15%) were added and the mixture was filtered through silica gel. The silica gel was washed with ether, the organic phase was dried over sodium sulphate and the solvent was distilled off. (Z)-8-tetradecen-1-ol (5) was obtained.

(Z)-8-Tetradecenal (6)

(Z)-8-tetradecenal (6) was prepared analogously to the method of E. J. Corey, G. Schmidt, *Tetrahedron Letters* 1979, 399-402:

15.8 g pyridinium dichromate in 300 ml dichloromethane were initially introduced under blanketing gas and 5.93 g (Z)-8-tetradecen-1-ol (5) in 50 ml dichloromethane was added, with stirring. The reaction mixture was stirred for 15 h at room temperature and filtered through silica gel. Distillation under a high vacuum gave (Z)-8-tetradecenal (6).

$^1$H-NMR (300 MHz, CDCl$_3$): δ=0.89(t, J=7.0 Hz, 3H), 1.23-1.40 (m, 12H), 1.63 (quint, J=7.5 Hz, 2H), 1.95-2.05 (m, 4H), 2.42 (dt, J=1.8, 7.5 Hz, 2H), 5.35 (m$_c$, 2H), 9.77 (t, J=1.38 Hz, 1H). $^{13}$C-NMR (75 MHz, CDCl$_3$): δ=14.09, 22.08, 22.61, 27.11, 27.21, 29.00, 29.09, 29.46, 29.53, 31.55, 43.90, 129.6, 130.1, 202.8.

EXAMPLE 5

Synthesis of (E)-8-tetradecenal

Figure 2:
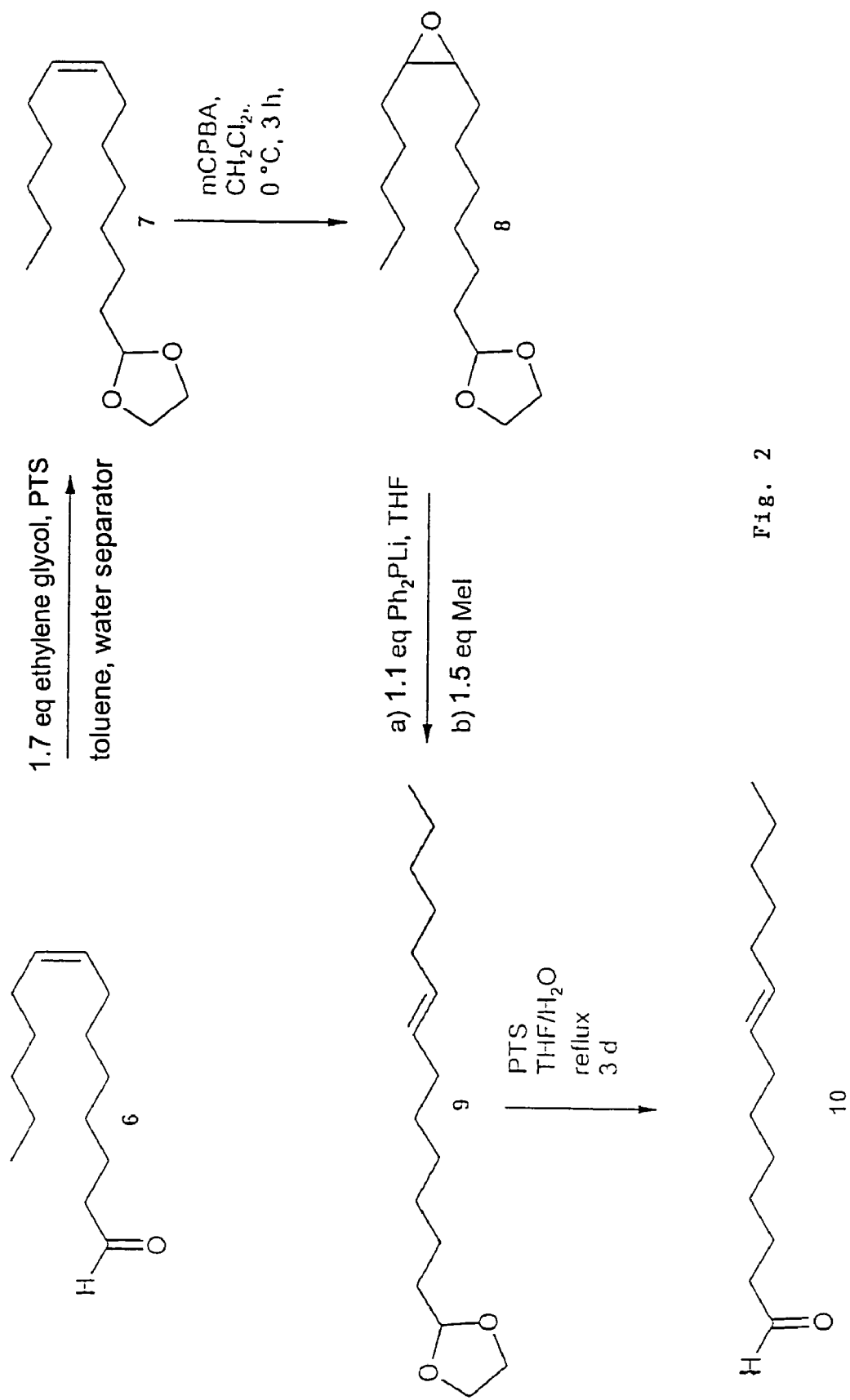
FIG. 2 shows a diagrammatic scheme for the synthesis of (E)-8-tetradecenal.

The synthesis is shown diagrammatically in FIG. 2.

(E)-8-tetradecenal (10) was rendered accessible from (Z)-8-tetradecenal (6) in four steps by inversion of the double bond configuration: protection of the aldehyde functional group as dioxolane (7), epoxidation with m-chloroperbenzoic acid to give the oxirane (8), nucleophilic epoxide opening with inversion of the original double bond geometry in accordance with the method of Vedejs to give the (E)-Alkene (9) and acid-catalysed deprotection of the acetal to give the target compound (E)-8-tetradecenal (10).

2-[(Z)-Tridec-7-enyl]-1,3-dioxolane (7)

2-[(Z)-tridec-7-enyl]-1,3-dioxolane (7) was prepared analogously to the method of K. Schwetlick et al., *Organikum*, (*Organic Chemistry*) 17. Ed. VEB Verlag, Berlin 1988, 398:

5.6 g (Z)-8-tetradecenal (6), 2.0 g ethylene glycol and 20 mg p-toluenesulphonic acid in 150 ml toluene were boiled in a water separator for 3 h. The reaction mixture was washed with sodium bisulphate solution and dried over sodium sulphate and the solvent was distilled off. Chromatography on silica gel gave 2-[(Z)-tridec-7-enyl]-1,3-dioxolane (7).

2-[(7R,8S/7S,8R)-Epoxy-tridecanyl]-1,3-dioxolane (8)

Epoxidation with MCPBA in general: D. Swern, Organic Peroxides, Vol. 2, Wiley-Interscience, Interscience, New York 1971, 355-533.

3.75 g 2-[(Z)-tridec-7-enyl]-1,3-dioxolane (7) were initially introduced into 50 ml dichloromethane and 5.44 g m-chloroperbenzoic acid (70%) was added in portions at 0° C. The reaction mixture was stirred for 3 h at 0° C., diluted with 50 ml dichloromethane and washed with sodium carbonate solution (10%, 2×30 ml) and NaCl solution (saturated, 30 ml). The reaction mixture was dried over sodium sulphate and the solvent distilled off. 2-[(7R,8S/7S,8R)-epoxy-tridecanyl]-1,3-dioxalane (8) was obtained.

2-[(E)Tridec-7-enyl]-1,3-dioxolane (9)

2-[(E)tridec-7-enyl]-1,3-dioxolane (9) was prepared analogously to the method of E. Vedejs, P. L. Fuchs, *J. Am. Chem. Soc* 1973, 95, 822-825:

Lithium diphenylphosphide, ≈0.9 M in THF: 11.0 g chlordiphenylphosphine were added dropwise under blanketing gas to 0.76 g lithium wire in 50 ml dry THF. The reaction mixture was stirred for one day at room temperature.

2-[(E)Tridec-7-enyl]-1,3-dioxolane (9): 13.3 ml lithium diphenylphosphide (≈0.9 M in THF) were initially introduced into 30 ml THF (abs.) and 2.70 g 2-[(7R,8S/7S,8R)-epoxy-tridecany]-1,3dioxalane (8) in 10 ml THF were added dropwise at room temperature. The reaction mixture was stirred for 2.5 h, 0.94 ml methyl iodide was added and the reaction mixture was stirred for 1 h. The reaction mixture was quenched for 30 min with 20 ml water and extracted with 500 ml diethyl ether. The extract was washed with NaCl solution (saturated) and dried over sodium sulphate and the solvent was distilled off. Triphenylphosphine oxide was separated off by crystallisation with pentane at −18° C. Distillation under a high vacuum gave 2-[(E)tridec-7-enyl]-1,3-dioxolane (9).

(E)-8-Tetradecenal (10)

Deprotection of an ethlene (sic) glycol acetal by acid hydrolysis in accordance with the method of J. Kocienski, *Protecting Groups*, Georg Thieme Verlag Stuttgart, New York 1994, 157-163:

0.89 g 2-[(E)tridec-7-enyl]-1,3-dioxolane (9), 30 mg p-toluenesulphonic acid and 25 ml of water were boiled in 75 ml methanol for 72 h under reflux under blanketing gas (86% conversion). The reaction mixture was extracted twice with 200 ml diethyl ether, washed with 30 ml sodium bicarbonate solution and dried over sodium sulphate and the solvent was distilled off under vacuum. Flash chromatography on silica gel gave (E)-8-tetradecenal (10) (E/Z ratio according to GC>97/3).

$^1$H-NMR (300 MHz, CDCl$_3$): δ=0,88 (t, J=6.9 Hz, 3H), 1.23-1.40 (m, 12H), 1.63 (quint, J=7.2 Hz, 2H), 1.93-2.03 (m, 4H), 2.42 (dt, J=1.8, 7.3 Hz, 2H), 5.35 (m$_c$, 2H), 9.79 (t, J=1.8 Hz, 1H). $^{13}$C-NMR (75 MHz, CDCl$_3$): δ=14.09, 22.07, 22.57, 28.83, 29.04, 29.35, 29.39, 31.42, 32.49, 32.59, 43.91, 130.0, 130.6, 202.8.

What is claimed is:

1. An article comprising a perfume or flavoring agent, wherein said perfume or flavoring agent comprises (Z)-8-tetradecenal, (E)-8-tetradecenal, or a mixture thereof.

2. A method for imparting a citrus perfume or citrus flavor to, or intensifying the citrus perfume or citrus flavor of, a base composition comprising constituents, said method comprising mixing said constituents with an amount of (Z)-8-tetradecenal, (E)-8-tetradecenal, or a mixture thereof, that imparts a citrus scent or citrus flavor to said base composition or intensifies the citrus odor or citrus flavor of said base composition.

3. A method for modifying a perfume or flavor composition, said method comprising adding to said composition (Z)-8-tetradecenal, (E)-8-tetradecenal, or a mixture thereof, in an amount that modifies the perfume or flavor of said composition by adding or intensifying citrus notes.

4. A perfume or flavor composition comprising an amount of (Z)-8-tetradecenal, (E)-8-tetradecenal, or a mixture thereof, that imparts or intensifies a citrus scent or citrus flavor.

5. The perfume or flavor composition according to claim 4, wherein said composition comprises about 0.001 to about 1% (m/m) (Z)-8-tetradecenal, based upon the total mass of the composition.

6. The perfume or flavor composition according to claim 5, wherein said composition comprises 0.001 to 0.1% (m/m) (Z)-8-tetradecenal, based upon the total mass of the composition.

7. An article comprising about 0.0001 to about 1% (m/m) of a perfume or flavor composition according to claim 4, based upon the total mass of said article.

8. The article of claim 7, wherein said article comprises 0.001 to 0.1% (m/m), based upon the total mass of the article, of said composition.

9. An article comprising about 1 ppb to about 100 ppm (Z)-8-tetradecenal, based upon the total mass of said article, wherein said article has a citrus odor or citrus flavor.

10. The article of claim 1, wherein the article is a personal hygiene product, a cleaning agent, or another product not intended for consumption.

11. The article of claim 1, wherein the article is food or a drink.

* * * * *